Feb. 6, 1951     C. E. NORTH     2,540,830
PROCESS OF TREATING MILK OIL
Filed July 6, 1946
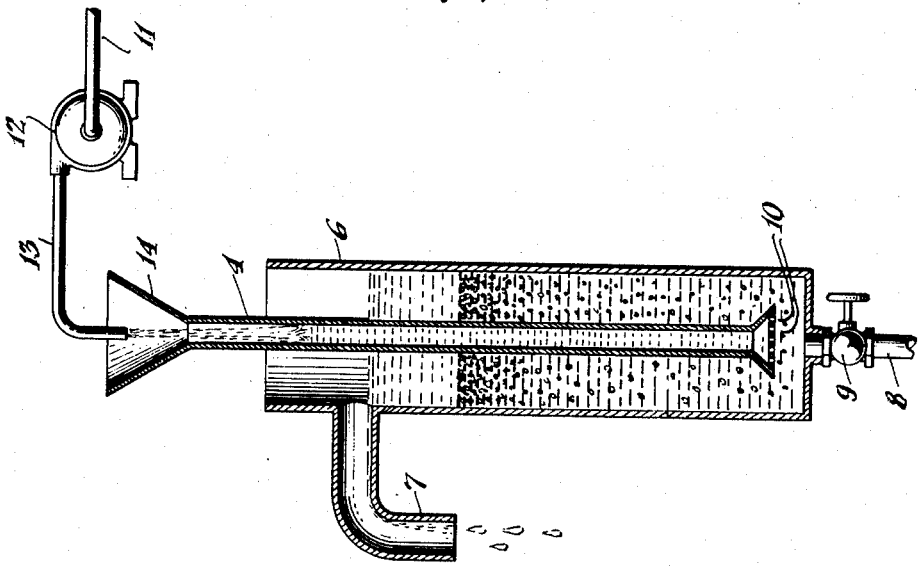
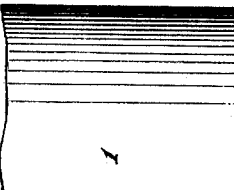
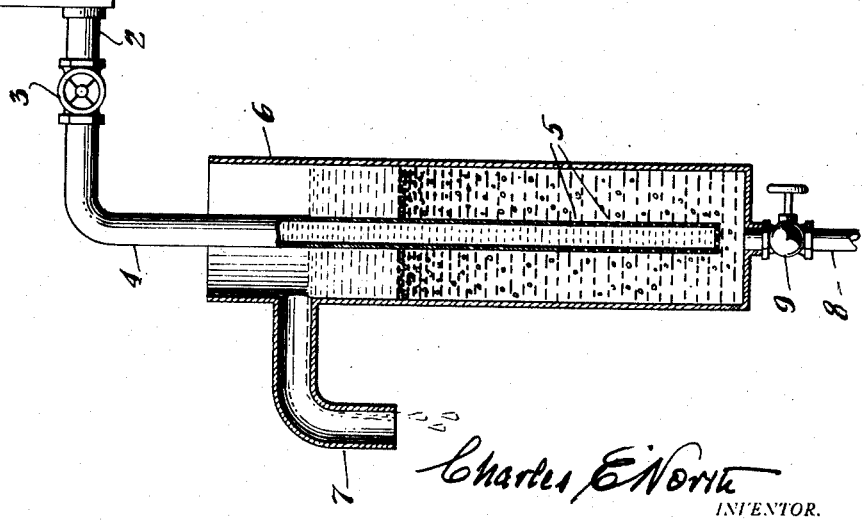
Charles E. North
INVENTOR.

Patented Feb. 6, 1951

2,540,830

UNITED STATES PATENT OFFICE 2,540,830

PROCESS OF TREATING MILK OIL

Charles E. North, Montclair, N. J.

Application July 6, 1946, Serial No. 681,756

7 Claims. (Cl. 99—119)

This invention relates to the production of butter fat or milk oil.

As is well known, milk and cream are emulsions of butter fat or milk oil in an aqueous medium, the fat or oil being present in the form of minute globules each one of which is surrounded by a coating or jacket of an emulsifying agent or agents. The latter include such compounds as casein, albumin, globulin and lecithin. The spaces or interfaces between the fat globules and aqueous medium (or milk serum) are filled with a film of a hydrophilic colloid which is called an adsorption film and which is composed of the emulsifying agents combined with sufficient water to form a coating or jacket around the fat globules. This hydrophilic colloid is shared by similar colloidal material suspended in the aqueous medium surrounding the fat globules, but is more concentrated around these globules than in the surrounding medium.

Butter fat or milk oil is extracted or recovered from cream in the usual procedures, first, by whipping cream at a temperature of, say, 45° F. to 50° F. to obtain an emulsion saturated with air, second, by churning the whipped cream at about the same temperature to release or break the fat globules from their enclosing jackets or coatings, and third, agglomerating the milk oil into lumps of solid butter fat. Afterwards, these lumps are washed one or more times with cold water to eliminate any residual milk and also solids not fat. Next, the fat may be melted and subjected to a centrifuging operation (while in the molten state) to separate water and/or solids not fat which may be entrained in the molten material.

Butter fat or milk oil made by such process always yields a cloudy or turbid liquid when melted. This cloudiness or turbidity can be ascribed to the presence of small proportions of water and emulsifying agents, chiefly casein and to a less extent to albumin, lecithin and other solids not fat which give rise to the adsorption film previously mentioned as filling the interfaces between and coating the fat globules in cream. Although the proportion of materials causing this cloudiness is small, usually 1 per cent or less and in many instances of the order of 0.1 per cent, nevertheless it is impossible to eliminate this cloudiness by washing the milk oil with water. Nor can the turbidity be overcome by subjecting the melted butter fat to a centrifuging operation, since the hydrophilic colloid has a specific gravity almost identical with that of milk oil.

One object of my invention is the production of butter fat or milk oil which is substantially free of all cloudiness. Another object is to provide a process, which may be a continuous one, for the production of milk oil substantially devoid of any turbidity. Other objects and advantages of my invention will be apparent from the disclosures made herein.

My process is illustrated diagrammatically by the accompanying drawings in which Fig. 1 shows one type of apparatus which is suitable for my purpose. Fig. 2 shows a modification of this apparatus. In these drawings, the same numeral is employed to designate the same part.

As shown in Fig. 1, the apparatus includes a storage tank 1 for melted milk oil from a prior operation. Near the bottom of this tank is outlet pipe 2 which is connected by means of valve 3 with feed pipe 4. The end of the latter is a perforated portion or section 5 which is located near the bottom of the upright cylinder 6. The upper end of this cylinder is open and near this open end is located overflow pipe 7. The bottom of cylinder 6 is closed but to it is attached drain pipe 8 and this pipe in turn is connected with valve 9.

In Fig. 2, inlet pipe 11 is connected with pump 12 to which is joined outlet pipe 13. The open end of this pipe is located within funnel 14 which is attached to pipe 4. The latter has a flared and perforated end portion 10 which is located near the bottom of upright cylinder 6. The remaining parts of this apparatus are the same as those described for Fig. 1.

With reference to Fig. 1, the operation is as follows: Tank 1 is filled with melted butter fat which flows through pipes 2 and 4. The rate of flow may be regulated by means of valve 3. Cylinder 6 is filled, say, two-thirds full, with a dilute aqueous solution of an acid. The volume of aqueous acid should be sufficient to submerge perforated end portion 5 of feed pipe 4 and to give a liquid level an appreciable height above this perforated portion. This solution is kept at a temperature approximately that of or higher than the melting point of milk oil but not exceeding that of the boiling point of water. The liquid fat flows through pipe 4 and emerges from perforated portion 5 in the form of very small droplets which disperse themselves throughout the aqueous solution. As the density of the fat is less than that of water, the droplets travel upwards through the acidic liquid and coalesce on its surface to form a mass of melted fat floating on the aqueous medium. As the collected liquid fat accumulates in volume and fills the empty space in cylinder 6, it soon overflows through pipe 7 and can be caught in some suitable container. The treated melted fat afterwards is subjected to a washing operation with warm water and then to a centrifuging operation, the latter step eliminating any entrained aqueous liquid or solid material. In some instances the washing operation may be omitted.

As the droplets of liquid fat travel upwards through the acidic medium, the latter effects agglomeration and/or precipitation of those bodies which impart a cloudy appearance to the melted liquid fat. Some of these agglomerated or precipitated bodies remain suspended in the aqueous liquid or settle to the bottom of cylinder 6, from which they may be withdrawn (together with some aqueous liquid) through pipe 8 by means of valve 9. The remainder of these bodies are suspended in the molten milk oil from which they can be separated by a centrifuging operation.

Tank 1 and cylinder 6 may be heated in any convenient manner, as for example, with steam or hot water coils located either within these parts of the apparatus or surrounding them, or by a steam or hot water jacket surrounding the tank and the cylinder. Such heating means are not shown in the drawings.

With reference to Fig. 2, the operation is as follows: By means of pump 12, molten butter fat (from a prior operation) is drawn through pipe 11 and forced through pipe 13 into funnel 14. In this instance the speed of the pump controls the rate of feed of milk oil. From this funnel the butter fat (or milk oil) flows through pipe 4 and then outwards through perforated end portion 10 is the form of small droplets which, because their density is less than that of water, rise upwards through the acidic liquid contained in cylinder 6. The droplets coalesce and form a mass of melted fat on the surface of the aqueous acid in cylinder 6 and, when the volume of melted fat becomes sufficiently large, this mass overflows through pipe 7 and is caught in some suitable container. It then is washed with warm water and subjected to a centrifuging operation.

Although I have illustrated the apparatus in Fig. 2 as possessing funnel 14 as the receptacle into which the liquid fat is pumped, it is not to be understood that the geometrical shape of this receptacle is important. In place of a funnel I may use, for example, a box-like vessel which is rectangular in shape. The reason for using an element 14 in the apparatus is this: the pump may impart a surging or pulsating motion to the column of liquid fat passing through pipe 13 and if a surging or pulsating column of fat flowed through pipe 4 and perforated end portion 10 there may be considerable agitation of the acidic liquid in cylinder 6 and consequently some of the acid splashed into pipe 7 or carried by the liquid fat as some of the latter passes into this pipe. A receptacle, such as funnel 14, permits accumulation of a body of melted fat from which a steady stream of this melted material flows through pipe 4.

As previously mentioned, the density of milk oil is less than that of water. To secure a steady flow of liquid fat through pipe 4 it is necessary, therefore, that container 1 (of Fig. 1) and funnel 14 (of Fig. 2) be placed in a position sufficiently high above the level of the aqueous acid in cylinder 6 so that the column of liquid fat in tube 4 will be great enough in length to exert a pressure which will force the fat through perforated end portion 5 (of Fig. 1) or 10 (of Fig. 2).

As indicated above, container 1 (of Fig. 1) and cylinder 6 (of Figs. 1 and 2) may be heated in any convenient or appropriate manner. In some instances I find it desirable also to heat funnel 14 (of Fig. 2). The molten fat should always be kept in a state sufficiently fluid so that it will flow readily through the apparatus. Moreover, the aqueous acid should be sufficiently warm so that the fat will not be cooled to such a degree that it becomes a solid while in contact with the acidic medium. As milk oil melts at 96° F., or thereabouts, the various parts of the apparatus should be maintained at this temperature or at higher temperatures but not greater than about 212° F., i. e., the boiling point of water. In some cases I have found it convenient to place the entire apparatus, with the exceptions of container 1 (of Fig. 1) and pump 12 and pipe 11 (of Fig. 2), within a housing which is kept at the desired temperature.

Many mineral or carboxylic acids are applicable for my purpose. Examples of mineral acids which I may use are sulfuric, hydrochloric, hydrobromic or phosphoric. Illustrations of carboxylic acids, which may be either acyclic or cyclic, are formic, acetic, oxalic, maleic, malonic or prehnitic. I may employ also hydroxy-substituted carboxylic acids, that is acids containing one or more hydroxy groups in addition to one or more carboxy groups, e. g., tartaric, lactic or mandelic acid. Other substituted acids, such as levulinic acid, may be useful. Preferably, the acids employed by me are those which exhibit an appreciable or substantial solubility in water at room temperature, will not exert any harmful or deleterious action on the fat and are stable at the temperatures necessary to keep the fat in a liquid state. As a guide, the acids should exhibit a solubility in water at room temperature of about 2 grams per 100 cc. of water, or greater.

Moreover, the aqueous solutions of appropriate acids need not be concentrated, in fact I find that fairly dilute solutions containing about 0.5 to 1.0 per cent by weight, or thereabouts, of the water-soluble acids are suitable in many instances. However, aqueous solutions of somewhat greater concentrations, say 2, 3 or 5 per cent, can be used. In any event, the aqueous acid should be sufficiently concentrated to effect rapid agglomeration and/or precipitation of those bodies in milk oil to which cloudiness or turbidity can be attributed.

As the quantity of material which is precipitated or eliminated from milk oil is small, only a relatively small volume of aqueous acid will serve for the treatment of a relatively large quantity of fat. For this reason my process can be made continuous by conducting an uninterrupted stream of the melted fat into the aqueous acid over a long period of time. There will be slight losses of the aqueous acid due to slow evaporation of the aqueous medium or due to minute quantities of the acid liquor becoming entrained in the milk oil. Any entrained acid liquor, of course, can be eliminated from the fat by water washing. Small losses of the aqueous medium can be remedied by addition of either water or acid solution, as the case may be, occasionally to the acid solution being used.

After the solution of acid has been employed for some time it can be withdrawn from cylinder 6 through pipe 8 and valve 9, filtered to free it of any suspended or precipitated bodies, and brought back to its original concentration by admixing with it either water or acid, as may be necessary. The aqueous solution of acid then is ready to be used again.

As a specific example of the application of my process, in one instance an apparatus as shown in Fig. 2 was employed. The cylinder was 6 inches in diameter and 15 inches in height and the aqueous acid was a 0.7 per cent solution of lactic acid. The funnel was 15 inches above the upper level of the acidic liquid. Melted milk oil was pumped through the apparatus at the rate of 250 lbs. per hour and the temperature of the acid during this operation was maintained at 140° to 145° F. After treatment with the acid, the melted fat was centrifuged to eliminate small quantities of entrained aqueous liquid and precipitated solids. Before treatment, the melted fat was distinctly cloudy and turbid in appearance and this cloudiness could not be removed by centrifuging. After treatment and centrifugation according to my process, all cloudiness disappeared and a clear liquid of melted fat having a light yellow color was obtained.

What I claim is:

1. The process which comprises conducting melted turbid milk oil containing about 99 per cent butter fat through a conduit having a perforated end portion submerged in a stationary body of liquid consisting of an aqueous solution of an acid, forcing said melted milk oil through said perforated portion into said body of liquid, maintaining said body of liquid at a temperature not less than about the melting point of said milk oil and not more than about 212° F., collecting said milk oil forced through said perforated portion as a liquid mass floating on said body of liquid, separating said floating mass of milk oil from said body of liquid, and centrifuging said separated milk oil.

2. The process which comprises conducting melted turbid milk oil containing about 99 per cent butter fat through a conduit having a perforated end portion submerged in a stationary body of liquid consisting of an aqueous solution of an acid, the concentration of said acid being not less than about 0.5 per cent and not more than about 1 per cent, forcing said melted milk oil through said perforated portion into said body of liquid, maintaining said body of liquid at a temperature not less than about the melting point of said milk oil and not more than about 212° F., collecting said milk oil forced through said perforated portion as a liquid mass floating on said body of liquid, separating said floating mass of milk oil from said body of liquid, and centrifuging said separated milk oil.

3. The process, according to claim 2, in which the aqueous solution of acid is an aqueous solution of a mineral acid.

4. The process, according to claim 2, in which the aqueous solution of acid is an aqueous solution of a carboxylic acid.

5. The process, according to claim 2, in which the aqueous solution of acid is an aqueous solution of a hydroxy-substituted carboxylic acid.

6. The process which comprises conducting melted turbid milk oil containing about 99 per cent butter fat through a conduit having a perforated end portion submerged in a stationary aqueous solution of lactic acid, the concentration of lactic acid in said aqueous solution being about 0.7 per cent, forcing said melted milk oil through said perforated portion into said solution of lactic acid, maintaining said aqueous solution of lactic acid at a temperature not less than about the melting point of said milk oil and not more than about 212° F., collecting said milk oil forced through said perforated portion as a liquid mass floating on said aqueous solution of lactic acid, separating said floating mass of milk oil from said aqueous solution of lactic acid, and centrifuging said separated milk oil.

7. The process which comprises continuously conducting melted turbid milk oil containing about 99 per cent butter fat through a conduit having a perforated end portion submerged in a stationary body of liquid consisting of an aqueous solution of an acid, the concentration of said acid being not less than about 0.5 per cent and not more than about 1 per cent, continuously forcing said melted milk oil through said perforated portion into said body of liquid, maintaining said body of liquid at a temperature not less than about the melting point of said milk oil and not more than about 212° F., continuously displacing said melted milk oil forced through said perforated portion and floating on said body of liquid by melted milk oil forced through said perforated portion, continuously washing said displaced melted milk oil with water at a temperature not less than about the melting point of said milk oil and not more than about 212° F., and centrifuging said washed milk oil.

CHARLES E. NORTH.

REFERENCES CITED

The following references are of record in the file of this patent:

UNITED STATES PATENTS

| Number | Name | Date |
| --- | --- | --- |
| 2,365,217 | Rogers | Dec. 19, 1944 |
| 2,414,837 | Riggs | Jan. 28, 1947 |